United States Patent [19]

Simmons

[11] Patent Number: 4,757,955
[45] Date of Patent: Jul. 19, 1988

[54] TELEPHONE CORD WIND-UP APPARATUS

[76] Inventor: Henry C. Simmons, 622 31st St., Des Moines, Iowa 50312

[21] Appl. No.: 98,303

[22] Filed: Sep. 18, 1987

[51] Int. Cl.[4] .................................... B65H 75/48
[52] U.S. Cl. ............................ 242/107.6; 191/12.2 R
[58] Field of Search ................. 242/107, 107.7, 107.6; 191/12.2 R, 12.2 A, 12.4

[56] References Cited

U.S. PATENT DOCUMENTS

| | | | |
|---|---|---|---|
| 1,945,842 | 2/1934 | Witchger | 242/107.6 |
| 2,172,043 | 9/1939 | Wolf | 242/107.6 |
| 3,657,491 | 4/1972 | Ryder et al. | 242/107.7 X |
| 4,068,383 | 1/1978 | Krebs | 242/107.6 X |
| 4,384,688 | 5/1983 | Smith | 242/107.7 |

FOREIGN PATENT DOCUMENTS 1590160 5/1981 United Kingdom ............... 242/107

Primary Examiner—John M. Jillions
Attorney, Agent, or Firm—Jack C. Munro

[57] ABSTRACT

A telephone cord wind-up apparatus which takes the form of a reel upon which is wound a given length of a main telephone cord. This reel is rotatably mounted within a housing. The reel is to be unwound from the housing during the extending of the main telephone cord with there being a ratchet device connecting the reel and the housing. A standard telephone cord is also connected to the housing with a positive electrical connection being provided between the standard electrical cord and the main telephone cord. A spring mounts the reel with respect to the housing with this spring also being utilized in part for establishing of the positive electrical connection. The housing is mounted on a mounting tube and is pivotally mounted in respect thereto. The mounting tube is to be fixedly secured to an exterior structure.

6 Claims, 2 Drawing Sheets

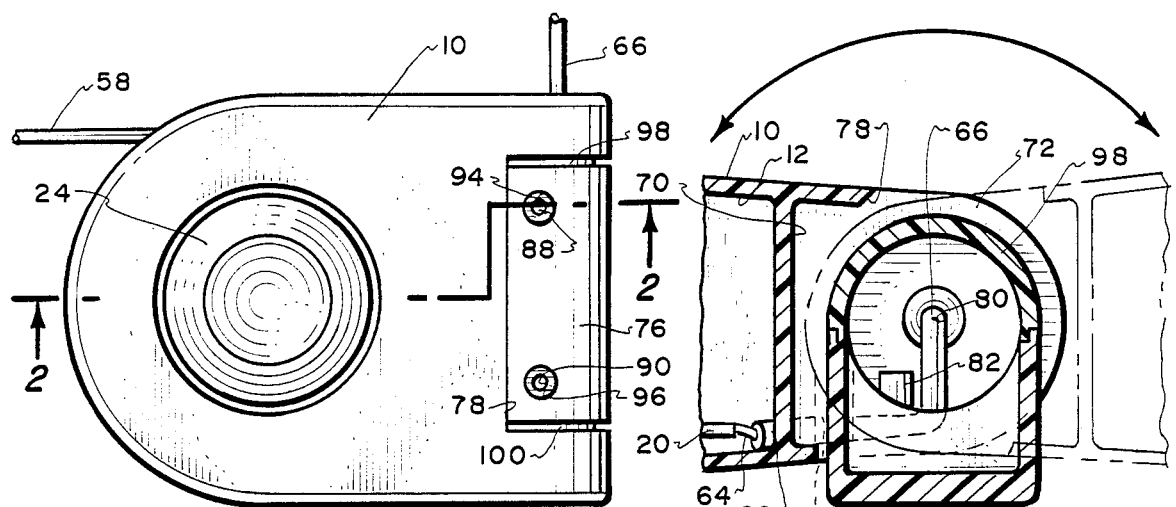
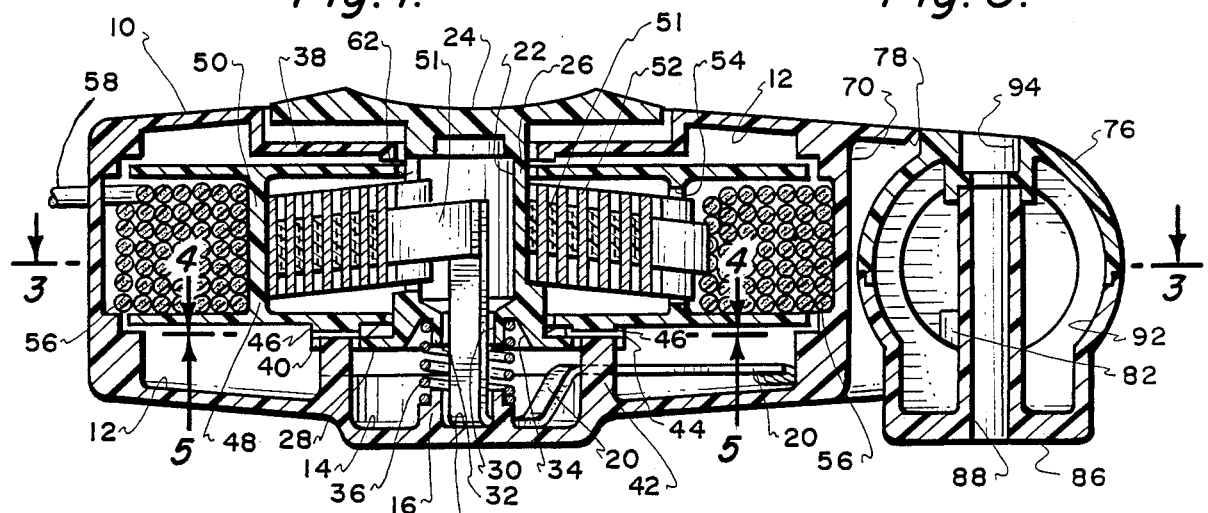
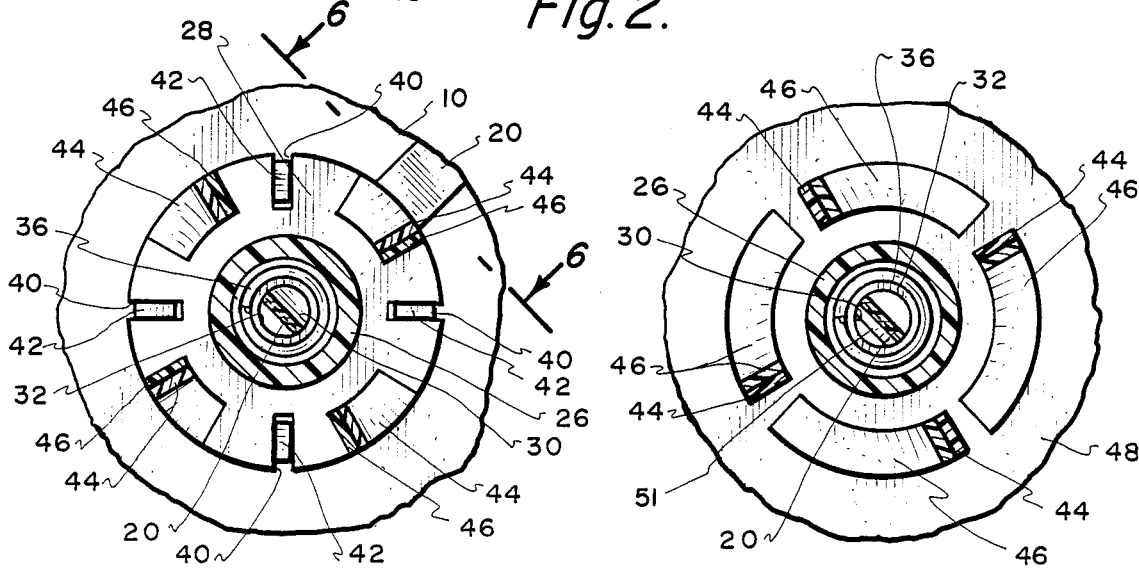

TELEPHONE CORD WIND-UP APPARATUS

BACKGROUND OF THE INVENTION

The field of this invention relates to wind-up reels for cord-like objects and more particularly to wind-up reel apparatus to be utilized in conjunction with a telephone cord.

Within a house or building, it is normal to mount a telephone connector box on a wall. A telephone cord is then utilized from the wall to the telephone receiver. There is also utilized a second telephone cord between the receiver and the handset.

It has been common in the past to utilize some kind of device which permits usage of the telephone in an area remote from the wall socket connection. For this purpose, there has been utilized a coiled cord between either the wall socket and the receiver and/or between the receiver and the handset. This coiled cord will provide for a limited amount of movement of either the telephone or handset such as throughout the confines of a typical room.

If it is only desired to permit movement in the range of five to six feet, the use of such a coiled cord has been found to be very satisfactory. However, if it is desired to permit the movement of the telephone from twelve to twenty-five feet, the coiled cord itself assumes a rather undesirable length. Therefore, as lengths get greater, it would be desirable to incorporate some type of extension cord apparatus which would occupy a small amount of space and would not create a rather unsightly appearance when not being used.

In order to overcome the aforementioned objective, there have been utilized in the past at least one known form of wind-up reel mechanism wherein the telephone cord could be wound up internally within a reel housing when the cord is in a non-extending position. However, these wind-up reel mechanisms of the prior art have been known to operate with some degree of difficulty and were not designed in a manner to facilitate extending of the cord and ease of retraction of the cord.

SUMMARY OF THE INVENTION

The primary objective of the present invention is to construct a telephone cord wind-up apparatus wherein the telephone cord can be quickly extended and quickly retracted.

Another objective of the present invention is to construct a telephone cord wind-up apparatus which facilitates extending of the telephone cord within any given direction of a particular location such as within a room of a house or building.

Another objective of the present invention is to construct a telephone cord wind-up apparatus which is constructed of few parts and can be manufactured relatively inexpensively and therefore sold to the ultimate consumer at an inexpensive price.

Another objective of the present invention is to construct a telephone cord wind-up apparatus which establishes a positive electrical connection through the apparatus facilitating conducting of the electrical pulses which result in the voice transmission within the telephone.

The structure of the present invention provides for a mounting tube which is to be mounted onto a fixed exterior structure such as a wall of a building or house. The mounting tube includes an interior chamber which is to function to store any excess amount of standard telephone cord. A housing is mounted on the mounting tube assembly and is adapted to be pivoted in respect thereto up to almost three hundred sixty degrees. A standard telephone cord connects into the housing in the area of the mounting tube. The standard telephone cord then connects to a flexible laminated flat conductor which in turn is connected to a second such flat conductor which is mounted on a spring. This second flat conductor is then connected to the inner end of a main telephone cord which is wound on a reel. This reel is rotatably mounted within the housing. The outer end of this main telephone cord extends through an opening formed within the housing and is adapted to be extended exteriorly of the housing. The outer end of this main telephone cord is to be connected to either a telephone receiver or a telephone handset. As the main telephone cord is extended, it will remain in the extended position due to a ratchet mechanism mounted between the reel and the housing. This ratchet mechanism can be released by depressing of a button mounted on the housing which will permit the reel to move from a less than wound up position to the totally wound up position due to the action of the bias of the spring.

BRIEF DESCRIPTION OF THE DRAWINGS

FIG. 1 is a top plan view of the telephone cord wind-up apparatus of this invention showing the exterior surface of such;

FIG. 2 is a longitudinal cross-sectional view of the apparatus of this invention taken along line 2—2 of FIG. 2;

FIG. 4 is a cross-sectional view taken along line 4—4 of FIG. 2 showing in more detail the ratchet mechanism included within the apparatus of this invention;

FIG. 5 is a cross-sectional view taken along line 5—5 of FIG. 2 showing in further detail the ratchet mechanism;

FIG. 6 shows the ratchet release mechanism in the locked position and FIG. 7 shows such in the released position; and FIG. 8 is a cross-sectional view taken along line 8—8 of FIG. 3.

DETAILED DESCRIPTION OF THE SHOWN EMBODIMENT

Figure 3:
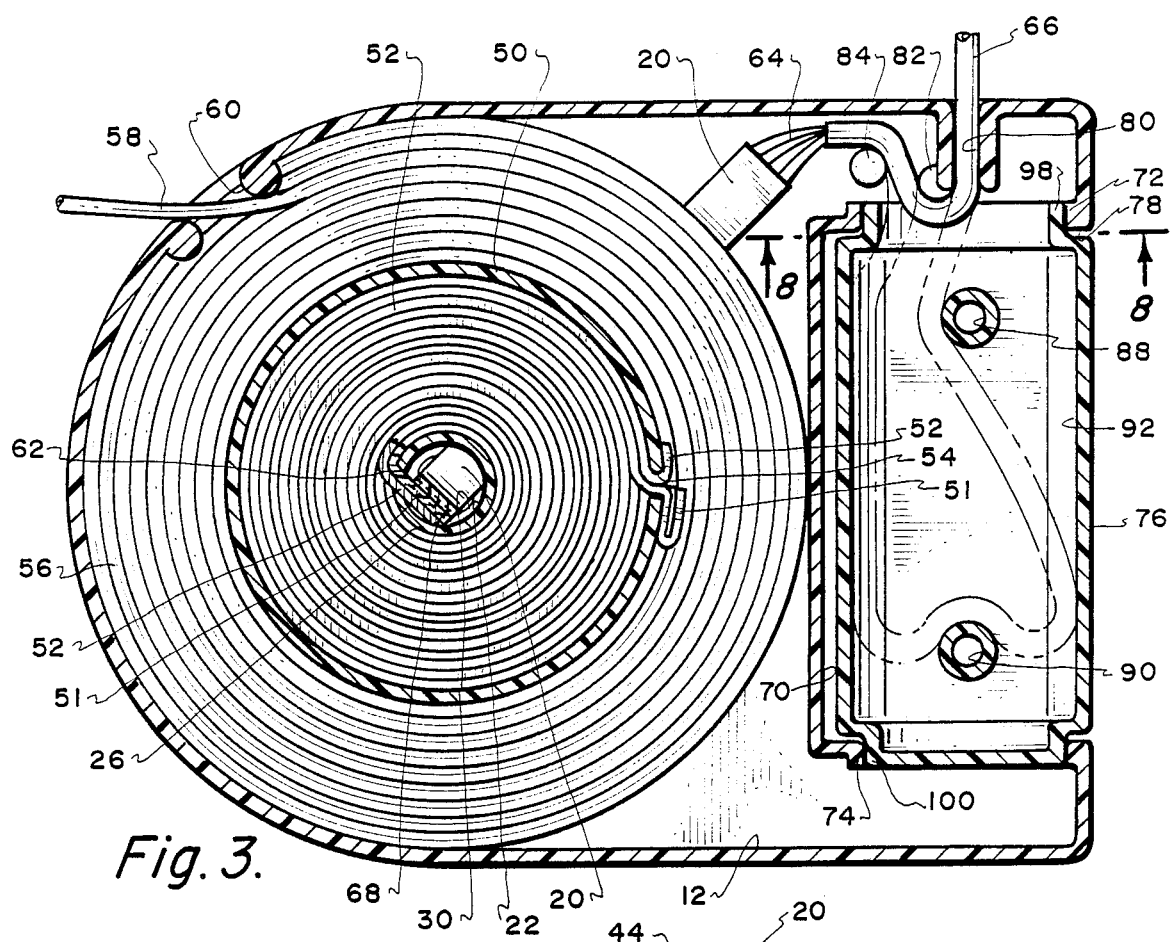
FIG. 3 is a cross-sectional view from the top taken along line 3—3 of FIG. 2.

Referring particularly to the drawings there is shown a telephone cord wind-up apparatus of this invention which has an exterior housing 10 with an internal chamber 12. The housing 10 will normally be constructed of two equally sized parts which will be assembled together forming an integral unit. Within the drawing, the housing 10 is shown to be a single unit when in fact it will be constructed of two parts.

Figure 6:
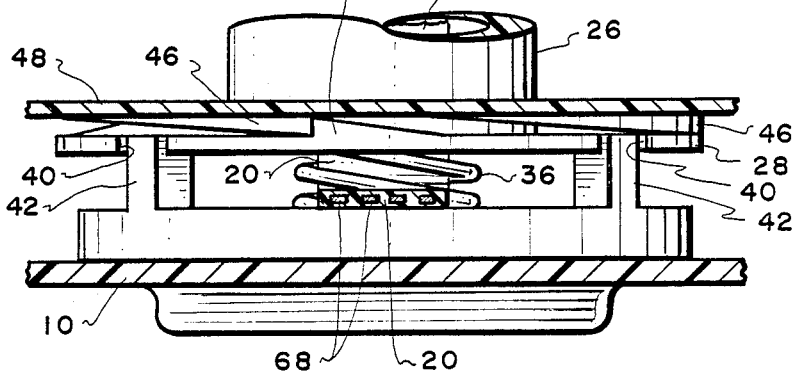
FIGS. 6 and 7 are similar views taken along line 6—6 of FIG. 4 where
Figure 7:
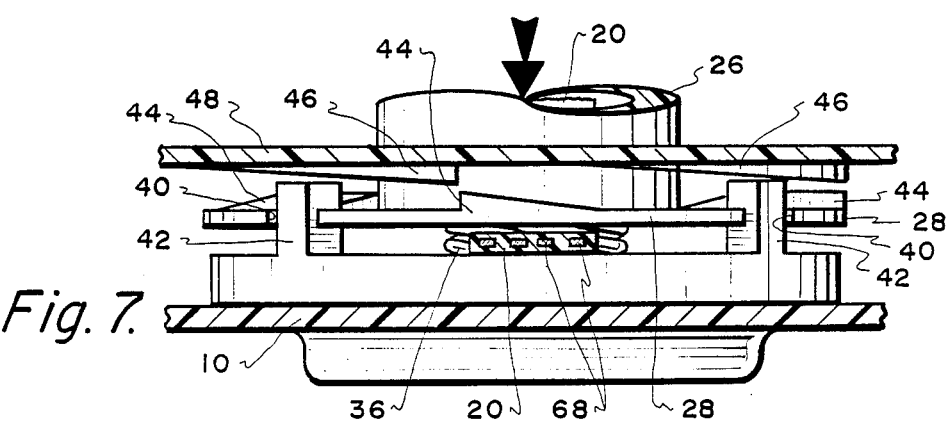

Within the bottom wall of the housing 10 there is centrally disposed a recess 14 which is part of internal chamber 12. Within the recess 14 there is disposed an upstanding boss 16. The upstanding boss 16 includes a recess 18. There is also formed a slot (not shown) through the side wall of the boss 16. A flexible electrical strip conductor 20 is to be conducted through this slot into recess 18 and then exteriorly from recess 18 to terminate within button chamber 22. Button chamber 22 is formed within tubular extension 26 of a manually depressible button 24. This tubular extension 26 terminates at its inner end with flange plate 28. Centrally disposed within the flange plate 28 is an opening 30. Surrounding the opening 30 and formed as part of the flange plate 28 is an annular collar 32. Located about the collar 32 and located within annular recess 34 is one end of a coil spring 36. The normal bias of the spring 36 is to locate the flange 28 and its integrally connected tubular extension 26 and its integrally connected button 24 in the position shown in FIGS. 2 and 6 of the drawings. Upon manually depressing button 24 until button 24 comes to rest against button cavity wall 38 will result in the coil spring 36 being compressed such as shown in FIG. 7 of the drawings.

Located within the periphery of the plate 28 are a plurality (four in number) of equally spaced apart slots 40. Within each slot 40 is located an upstanding projection 42. The projections 42 are integrally formed with the housing 10. It is the function of the slots 40 and the projections 42 to prevent rotational movement between the housing 10 and the flange plate 28. However, lineal movement of the flange plate 28 from the position shown in FIG. 6 to that shown in FIG. 7 will be permitted.

Mounted on the upper surface of the plate 28 are a plurality (four in number) of spaced apart cam members 44. These cam members 44 are to be connectable with a similar series of cam members 46 mounted on the lower surface of a reel 48. The function of the cam members 44 and 46 function as a ratchet assembly which will be described further on in this specification.

The reel 48 includes a centrally disposed hub wall 50. Within this hub wall 50 is coiled a flat spring 52. This flat spring 52 has bonded entirely along one surface thereof an electrical strip conductor 51. Conductor 51 is similar to conductor 20. The spring 52 generally is constructed of metal.

The outer end of the spring 52 extends through hole 54 formed within hub wall 50. This outer end of the spring 52 is fixed to inner end of telephone cord 56 forming a positive electrical connection between strip 51 and cord 56. The telephone cord 56 is wound about the exterior surface of the hub wall 50 with the outer end 58 of the telephone cord 56 being conducted through opening 60 formed within the housing 10. It is to be understood that this outer end 58 terminates in an electrically connecting plug (not shown) adapted primarily to connect with a telephone receiver or telephone handset (not shown).

The inner end of the spring 52 and strip 51 is conducted through a slot 62 which is formed within the tubular extension 26. This inner end of the strip 51 is electrically connected to the strip 20. The strips 20 and 51 each will be formed of four separate electrically conducting wires (such as wires 68 for strip 20) which are separated by nonconductive plastic. Both the electrically conductive wires and the plastic are bonded together to form a single unit. Within the telephone cord 56 there are located four in number of separate wires (not shown). Each wire within the cord 56 is to electrically connect with a separate electrical conductor of the strip 51. The outer end of the strip 20 is similarly electrically connected to the four separate wires 64 of electrical conductor 66. Electrical conductor 66 comprises a telephone cord which is similar to cord 56.

If one wishes to extend the end 58 of the telephone cord 56, the user only needs to physically pull on the end 58 unwinding the telephone cord 56 from the reel 50 and moving such through the opening 60. As the end 58 is extended, the members 46 ride over the members 44 producing a ratchet action. If the pulling force is stopped on the end 58, the rearwardmost shoulders of the members 46 and 44 will then abut with the coil spring 52 having a tendency to return the reel 48 to the position where the telephone cord 56 is substantially totally confined within the internal chamber 12. This position is shown within FIG. 2 of the drawings.

Let it now be assumed that some portion of the telephone cord 56 has been extended through the opening 60 and retraction of such is desired within the internal chamber 12. However, this retraction is now being prevented because of the abutting shoulders between the members 46 and 44. Therefore, the operator presses button 24 which moves button 24 down against button cavity wall 38. At this time, the member 44 is moved some slightly spaced distance from the members 46 as is clearly shown within FIG. 7 of the drawings. The biasing action of the spring 52 then causes the reel 48 to pivot causing retraction of the telephone cord 56 within the internal chamber 12 to again assume the totally stored position shown in FIG. 2 of the drawings.

One end of the housing 10 includes interior chamber 70. The upper and lower ends of the interior chamber 70 terminates with a pair of circular collars 72 and 74. The upper end of the tubular housing 76 terminates in a decreased diameter sleeve 98. The lower end of the tubular housing 76 also terminates in a similar sleeve 100. The sleeve 98 is low-frictionally supported within the collar 72 with the sleeve 100 also similarly low-frictionally supported within the collar 74. The tubular housing 76 fits within cutout opening 78 of housing 10. It is to be noted that housing 10 is capable of pivoting three hundred sixty degrees about the tubular housing 76 about a hinge axis along opening 80 formed within the housing 10. Through opening 80 is located the telephone cord 66. The cord 66 is conducted about guide pins 82 and 84 to conductors 64. The pins 82 and 84 are integrally mounted on the housing 10.

The tubular housing 76 includes a planar back wall 86. Within the back wall 86 are formed a pair of holes 88 and 90. These holes 88 and 90 pass directly through the hollow center section 92 of the tubular housing 76. Through holes 88 and 90 there is to be conducted appropriate fasteners (not shown) to mount the planar base 86 onto a fixed vertical surface such as a wall. The head of the fasteners (not shown) are to rest within enlarged recesses such as recess 94 of through hole 88. A similar recess 96 connects through hole 90.

Hollow chamber 92 is capable of connecting with extra length telephone cord 66. This telephone cord 66 can be manually pushed within chamber 92 assuming a position as represented by dotted lines within FIG. 3 of the drawings.

In normal operation with the planar base 86 fixedly attached to a vertical wall surface (not shown), the housing 10 will be movable one hundred eighty degrees from the solid line position shown in FIG. 8 to the dotted line position. This provides for directional orientating of the housing 10 in the direction of the telephone receiver (not shown). This provides for ease of extending of the end 58 of the cord 56 and prevents such from binding up.

What is claimed is:
1. A telephone cord wind-up apparatus comprising:
a housing having an internal chamber;
a reel rotatably mounted within said internal chamber;

a main telephone cord wound on said reel, said main telephone cord terminating at an inner end and an outer end, said housing having an outlet opening, said outer end extending through said outlet opening and located exteriorly of said housing, said inner end being connected to electrical connection means mounted within said internal chamber;

said housing having an inlet opening, said inlet opening having a longitudinal center axis, a standard telephone cord being conducted through said inlet opening into said internal chamber, said standard telephone cord being connected to said electrical connection means; and a mounting tube assembly adapted to be secured to an exterior structure, said housing being pivotally mounted about a pivot axis on said mounting tube assembly, said pivot axis coinciding with said longitudinal center axis, whereby as said housing pivots relative to said mounting tube assembly the said standard telephone cord does not hinder this pivoting movement since said standard telephone cord connects to said housing at said pivot axis.

2. The telephone cord wind-up apparatus as defined in claim 1 wherein:

a spring mounted between said reel and said housing, said reel being movable from a totally wound up position when said main telephone cord is substantially entirely wound on said reel to a less than wound up position when said main telephone cord is extended some distance exteriorly of said housing, said spring exerting a continuous bias tending to locate said reel in said totally wound up position.

3. The telephone cord wind-up apparatus defined in claim 2 wherein:

said spring comprising a coil, an electrical conductor connecting said main telephone cord and said standard telephone cord, said electrical conductor being mounted on said spring.

4. The telephone cord wind-up apparatus as defined in claim 3 wherein:

a ratchet device connected between said reel and said housing, said ratchet device normally preventing movement of said reel from said less than said wound up position to said totally wound up position, a ratchet disengaging device mounted on said housing, actuation of said ratchet disengaging device disengages said ratchet device which permits said reel to move from said less than wound up position to said totally wound up position.

5. A telephone cord wind-up apparatus comprising:

a housing having an internal chamber;

a reel rotatably mounted within said internal chamber;

a main telephone cord wound on said reel, said main telephone cord terminating at an inner end and an outer end, said housing having an outlet opening, said outer end extending through said outlet opening and located exteriorly of said housing, said inner end being connected to electrical connection means mounted within said internal chamber;

said housing having an inlet opening, a standard telephone cord being conducted through said inlet opening into said internal chamber, said standard telephone cord being connected to said electrical connection means;

a spring mounted between said reel and said housing, said reel being movable from a totally wound up position when said main telephone cord is substantially entirely wound on said reel to a less than wound up position when said main telephone cord is extended some distance exteriorly of said housing, said spring exerting a continuous bias tending to locate said reel in said totally wound up position;

said spring comprising a coil, an electrical conductor comprising said main telephone cord and said standard telephone cord, said electrical conductor being mounted on said spring;

a ratchet device connected between said reel and said housing, said ratchet device normally preventing movement of said reel from said less than said wound up position to said totally wound up position, a ratchet disengaging device mounted on said housing, actuation of said ratchet disengaging device disengages said ratchet device which permits said reel to move from said less than wound up position to said totally wound up position;

a mounting tube assembly adapted to be secured to an exterior surface, said housing being pivotally mounted on said mounting tube assembly; and a storage chamber for facilitating storage of the excess cord of said standard telephone cord, said storage chamber being part of said mounting tube assembly.

6. A telephone cord wind-up apparatus comprising:

a housing having an internal chamber;

a reel rotatably mounted within said internal chamber;

a main telephone cord wound on said reel, said main telephone cord terminating at an inner end and an outer end, said housing having an outlet opening, said outer end extending through said outlet opening and located exteriorly of said housing, said inner end being connected to electrical connection means mounted within said internal chamber;

said housing having an inlet opening, a standard telephone cord being conducted through said inlet opening into said internal chamber, said standard telephone cord being connected to said electrical connection means;

a mounting tube assembly adapted to be secured to an exterior structure, said housing being pivotally mounted on said mounting tube assembly; and a storage chamber for facilitating storage of the excess cord of said standard telephone cord, said storage chamber being part of said mounting tube assembly.

* * * * *